United States Patent
Morris

[11] 3,910,866
[45] Oct. 7, 1975

[54] ACRYLATE RUBBER VULCANIZABLE COMPOSITIONS

[76] Inventor: Roger E. Morris, 2951 9th St., Cuyahoga Falls, Ohio 44221

[22] Filed: Sept. 17, 1973

[21] Appl. No.: 398,090

[52] U.S. Cl. ....... 260/80.81; 260/42.49; 260/42.52; 260/63 R; 260/63 HA; 260/80.7; 260/80.73; 260/80.76
[51] Int. Cl.² .................................... C08F 220/10
[58] Field of Search ........... 260/80.8, 63 HA, 63 R, 260/42.49, 80.81, 80.7, 80.73, 80.76, 42.52

[56] References Cited
UNITED STATES PATENTS

| | | | |
|---|---|---|---|
| 3,492,265 | 1/1970 | Hefley et al. | 260/41 |
| 3,732,190 | 5/1973 | Balle et al. | 260/78.5 |
| 3,763,119 | 10/1973 | DeMarco et al. | 260/80.76 |

*Primary Examiner*—Lester L. Lee
*Attorney, Agent, or Firm*—Alan A. Csontos; J. Hughes Powell, Jr.

[57] ABSTRACT

Acrylate rubbers having both halogen and carboxyl cure sites are vulcanized using combinations of, as a curative, a nonalkali metal oxy compound and, as a cure accelerator, a quaternary ammonium salt, a tertiary amine or a guanidine. The vulcanized compositions exhibit good physical properties.

19 Claims, No Drawings

ACRYLATE RUBBER VULCANIZABLE COMPOSITIONS

BACKGROUND OF THE INVENTION

Acrylate rubbers exhibit very favorable qualities of weatherability, high temperature serviceability, and good oil resistance. These qualities make the rubbers useful for under-the-hood automotive applications and out-of-doors applications. However, better vulcanizate properties are desired. Much effort has gone into the development of both faster and more efficient cures of acrylate rubbers and more efficient types of acrylate rubbers. An article in Rubber Chemistry and Technology, Vol. 44, No. 2 (1971), traces the more recent efforts. Various cure sites and cure systems have been evaluated; see U.S. Pat. Nos. 3,288,763; 3,324,088; 3,337,492; 3,435,010; 3,450,681; 3,458,461 and 3,732,190. The use of metal oxides and hydroxides as curative agents has been evaluated; see U.S. Pat. Nos. 2,600,414; 2,649,439; 2,662,874; 2,669,550; 2,710,292; 2,724,707; 2,726,230; 2,754,280; 2,849,426; 2,970,132 and 3,404,134. However, none of the patents mentioned disclose the unique composition of this invention, i.e., the use of both an improved acrylate rubber type and an improved cure system.

SUMMARY OF THE INVENTION

The invention provides vulcanizable compositions comprising an acrylate rubber having both halogen and carboxyl cure sites, a non-alkali metal oxy compound selected from the group consisting of oxides, hydroxides and carbonates of Ba, Pb, Ca, Mg, Sr, Cu, Sn, Fe, Zn and Cd, and a cure accelerator selected from quaternary ammonium salts, tertiary amines, and guanidines. The vulcanizates exhibit improved physical properties.

DETAILED DESCRIPTION

The acrylate rubbers are interpolymers comprising acrylate monomer(s), a reactive halogen-containing monomer, and a carboxyl-containing monomer.

The acrylate rubber contains from about 40% to about 99.8% by weight, based upon the weight of the polymer, of an acrylate of the formula

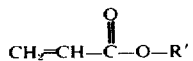

wherein R' is an alkyl radical containing 1 to 18 carbon atoms, an alkoxyalkyl or alkylthioalkyl radical containing a total of 2 to about 12 carbon atoms, or a cyanoalkyl radical containing 2 to about 12 carbon atoms. The alkyl structure can contain primary, secondary, or tertiary carbon configurations. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methyl-pentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxyethyl acrylate, ethoxypropyl acrylate, methylthioethylacrylate, hexylthioethylacrylate, and the like; and $\alpha$ and $\beta$-cyanoethyl acrylate, $\alpha,\beta$ and $\gamma$-cyanopropyl acrylate, cyanobutyl acrylate, cyanohexyl acrylate, cyanooctyl acrylate, and the like. Often, mixtures of two or more monomers and/or types of acrylate monomers are employed.

Preferredly, the rubber contains from about 65% to about 99.6% by weight of acrylate of the formula wherein R' is an alkyl radical containing 1 to about 10 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate, and the like, and methoxyethyl acrylate, ethoxyethyl acrylate, and the like. Both an alkyl acrylate and an alkoxyethyl acrylate can be used.

The rubber contains from about 0.1 to about 30% by weight of an active halogen-containing monomer. The halogen groups can be chlorine, bromine or iodine. These monomers are of two main types, halogen-containing vinylene hydrocarbons and halogen-containing vinyl monomers having the halogen group at least two carbon atoms removed from an oxygen atom(s). Examples of halogen-containing vinylene hydrocarbons are vinyl benzyl chloride, vinyl benzyl bromide, 5-chloromethyl-2-norbornene, 5-bromomethyl-2-norbornene, 5-$\beta$-chloroethyl-2-norbornene, and the like. The second type of monomer, i.e., those having the halogen group at least two carbon atoms removed from an oxygen atom are characterized by having ether (—O—), ketone

or ester

structures in the monomer where the halogen group is at least 2 carbon atoms and up to 6 or more carbon atoms removed from an oxygen atom. Examples of these monomers are halogen-containing vinyl esters such as vinyl chloroacetate, vinyl bromoacetate, allyl chloroacetate, vinyl 3-chloropropionate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; halogen-containing vinyl ethers such as 2-chloroethyl vinyl ether; halogen-containing vinyl ketones such as chloromethyl vinyl ketone, 2-chloroethyl vinyl ketone, and the like; and 5-chloroacetoxymethyl-2-norbornene, 5($\alpha,\beta$-dichloropropionylmethyl)-2-norbornene, and the like.

More preferably, the rubber contains from about 0.2 to about 15% by weight of the active halogen-containing monomer. At this level, the halogen content is from about 0.1 to about 5% by weight of the rubber. Due to availability and cost, the chlorine-containing monomers are preferred. Examples of the more preferred monomers are vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chloride, 5-chloromethyl-2-norbornene, 2-chloroacetoxyethyl acrylate and methacrylate, and 5-chloroacetoxymethyl-2-norbornene.

The rubbers also contain from about 0.1 to about 20% by weight of a carboxyl-containing monomer. The monomer can be monocarboxylic or polycarboxylic, containing from 3 to about 8 carbon atoms. Examples of such monomers are acrylic acid, methacrylic acid, ethacrylic acid, $\beta,\beta$-dimethyl acrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like.

More preferably, the rubber contains from about 0.2 to about 10% by weight of the carboxyl-containing monomer. At this level, the carboxyl content is from about 0.1 to about 7% by weight of the rubber. The more preferred monomers are the monocarboxylic acid monomers such as acrylic acid, methacrylic acid, itaconic acid, and the like.

The rubber can contain up to about 35% and preferably up to about 10% by weight of other copolymerizable vinylidene monomers having a terminal vinylidene ($CH_2=C<$) group. Examples of such are phenyl acrylate, cyclohexyl acrylate, methacrylates such as methyl methacrylate, ethyl methacrylate, and the like; vinyl and allyl esters such as vinyl acetate, vinyl propionate, allyl acetate, and the like; vinyl ketones such as methyl vinyl ketone; vinyl and allyl ethers such as vinyl methyl ether, vinyl ether ether, allyl methyl ether, and the like; vinyl aromatics such as styrene, $\alpha$-methyl styrene, vinyl toluene, and the like; vinyl nitriles such as acrylonitrile and methacrylonitrile; vinyl amides such as acrylamide, methacrylamide, N-methyl methacrylamide, and the like; and dienes and divinyls such as butadiene, isoprene, divinyl benzene, divinyl ether, diethylene glycol diacrylate, and the like. The more preferred copolymerizable monomers are vinyl acetate, methyl methacrylate, ethyl methacrylate, styrene, acrylonitrile, acrylamide, divinyl benzene and diethylene glycol diacrylate.

The acrylate rubbers can be prepared using emulsion (latex), suspension, solution, and bulk techniques known to those skilled in the art. Because it is desirable to polymerize the monomers to 90 percent conversion or over, emulsion and suspension techniques are usually employed. The polymerization can be performed as a batch reaction, or one or more ingredients can be proportioned during the run. Temperature of polymerization ranges from about $-10°C$. to about $100°C$., whereas a more preferred range is from about $5°C$. to about $80°C$.

The polymerization can be initiated by free-radical generating agents. Examples of such agents are organic peroxides and hydroperoxides such as benzoyl peroxide, dicumyl peroxide, cumene hydroperoxide, paramethane hydroperoxide, and the like, used alone or with redox systems; diazo compounds such as azobisisobutyronitrile and the like; persulfate salts such as sodium potassium, and ammonium persulfate, used alone or with redox systems; and the use of ultraviolet light with photo-sensitive agents such as benzophenone, triphenylphosphine, organic diazos, and the like.

Typical emulsion polymerization ingredients would include a persulfate salt or organic peroxide and usually a redox system, water adjusted to a desired pH with acids or bases and usually buffered with inorganic salts, and either anionic, cationic, nonionic surface active agents well known to the art.

The polymerization normally is continued until about 90% conversion of monomers is obtained. The resulting latex can be coagulated to isolate the polymer. Typical coagulation procedures are salt/acid coagulations, use of polyvalent metal salts such as $MgSO_4$, use of alcohols such as methanol and isopropyl alcohol, and freeze agglomeration techniques. The rubber is then usually washed with water and dried.

The acrylate rubbers are solid elastomers having a dilute solution viscosity (DSV) of over 0.5 as measured on 0.2 gram of rubber in 100 ml. benzene at $25°C$. Raw polymer Mooney values (ML-4, at $212°F$.) are from about 20 to about 100.

The rubbers are admixed with cure ingredients and compounding ingredients using two-roll mills, internal mixers such as Banburys and extruders, and like equipment.

The acrylate rubbers containing halogen and carboxyl cure sites can be vulcanized using known curatives. Examples of these curatives are the soap-sulfur systems such as potassium and sodium stearate, sodium acetate, and potassium tartate with sulfur or sulfur donors such as dipentamethylene thiuram hexasulfide; polyamines such as hexamethylene diamine, triethylene diamine, triethylene tetraamine, and the like; and ammonium-carboxylic acid salts such as ammonium benzoate, ammonium adipate, and ammonium stearate, used alone or with alkyl halides such as dodecyl bromide.

It has been found that the acrylate rubbers of this invention are efficiently vulcanized using, as a curative, a non-alkali metal oxy compound and, as a cure accelerator, a quaternary ammonium salt, a tertiary amine or a guanidine.

The non-alkali metal oxy compounds are oxides, hydroxides and carbonates of multivalent barium (Ba), lead (Pb), calcium (Ca), magnesium (Mg), strontium (Sr), copper (Cu), tin (Sn), iron (Fe), zinc (Zn) and cadmium (Cd). The more preferred non-alkali metal oxy compounds are the oxides and hydroxides of barium, lead, calcium, and magnesium. The compounds are used in a range from about 0.5 to about 20 parts by weight, and more preferably from about 1 part to about 10 parts by weight, based upon 100 parts by weight of the acrylate rubber. Examples of these compounds are barium oxide, barium hydroxide, barium carbonate, lead monoxide, lead dioxide, red lead oxide, lead sesquioxide, lead hydroxide, lead carbonate, calcium oxide, calcium hydroxide, calcium carbonate, magnesium oxide, magnesium hydroxide, magnesium carbonate, strontium oxide, cupric oxide, cupric hydroxide, cupric carbonate, dibutyltin oxide, ferric oxide, ferric hydroxide, zinc oxide, zinc hydroxide, zinc carbonate, cadmium oxide and cadmium hydroxide.

The cure accelerators are quaternary ammonium salts, tertiary amines, or guanidines. They are used in levels from about 0.1 to about 5 parts by weight based upon 100 parts by weight of the acrylate rubber. More preferredly, they are used at a level about 0.3 to about 3 parts by weight.

The quaternary ammonium salts are ammonium salts in which all four hydrogen atoms have been replaced with organic radicals. The quaternary ammonium salts include the structure

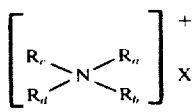

wherein $R_a$, $R_b$, $R_c$ and $R_d$ are hydrocarbon radicals containing 1 to 18 carbon atoms such as alkyl, aryl, alkaryl and aralkyl radicals, or wherein two or three of the $R_a$, $R_b$, $R_c$ and $R_d$ radicals form with the nitrogen atom a heterocyclic structure containing 3 to 8 atoms selected from the group consisting of C, N, O and S where at least two atoms are C; and X is an anion from an inorganic or organic acid wherein the acidic hydrogen is attached to halogen or oxygen. More preferredly, X is an anion such as $Cl^-$, $Br^-$, $I^-$, $HSO_4^-$, $H_2PO_4^-$, $RCOO^-$, $ROSO_3^-$, $RSO^{3-}$, $H_2BO_3^-$, and $ROPO_3H^-$, and R is an aliphatic alkyl, or alkaryl radical containing 1 to 18 carbon atoms. The aliphatic radical can contain ether, thioether, and/or ester structures. For example, it can be the reaction product of an organic acid or alcohol with ethylene oxide.

Examples of the quaternary ammonium salts are tetramethyl ammonium chloride, tetramethyl ammonium bromide, trimethyl ethyl ammonium iodide, trimethyl soya ammonium chloride, trimethyl cetyl ammonium bromide, trimethyl soya ammonium neodecanoate, trimethyl soya ammonium trimethyl hexanoate, trimethyl benzyl ammonium benzoate, trimethyl benzyl ammonium chloride, trimethyl benzyl ammonium paratoluene sulfonate, trimethyl soya ammonium alkyl benzene sulfonate, dimethyl ethyl cetyl ammonium chloride, dimethyl octyl benzyl ammonium chloride, dimethyl oleyl benzyl ammonium chloride, dimethyl octadecyl benzyl ammonium chloride, dimethyl phenyl benzyl ammonium bromide, dimethyl dibenzyl ammonium bromide, methyl ethyl propyl isobutyl ammonium chloride, (tetradecyl) trimethyl ammonium chloride, methyl cetyl dibenzyl ammonium bromide, cetyl pyridinium chloride, dodecyl pyridinium bromide, lauryl pyridinium sulfate, trimethyl benzyl ammonium borate, trimethyl benzyl ammonium hydrogen phosphate, trimethyl soya ammonium alkyl phenoxy poly(ethyleneoxy)ethyl phosphate, and the like.

The tertiary amines can be aliphatic or aromatic amines, cyclic methyleneamines, or heterocyclic amines. Examples of such amines are trimethyl amine, triethyl amine, triisopropyl amine, dimethylbutyl amine, tri-n-butyl amine, dimethylbenzyl amine, methyl dibenzyl amine, triethanol amine, 2,4,6-tri(-dimethylaminomethyl)phenol, N-methyl piperidine, N-methyl morpholine, triethylenediamine, quinuolidine, pyridine, 3-ethyl-4-methyl pyridine, 3-phenylpropylpyridine, 4,4'-dipyridyl propane, and the like. The more preferred tertiary amines are the cyclic methyleneamines and heterocyclic amines containing 4 to 8 atoms in the ring, and the tertiary aliphatic amines containing 1 to about 18 carbon atoms in the aliphatic group.

The tertiary amines can be employed as amine/acid adducts. In this form, increased scorch safety can be obtained. The acids can be inorganic or organic acids. Examples of the acids are hydrochloric acid, phosphoric acid, lauryl sulfonic acid, benzene sulfonic acid, para toluene sulfonic acid, alkyl benzene sulfonic acid, aromatic carboxylic acids such as benzoic acid, and aliphatic carboxylic acids such as acetic acid, propionic acid, butyric acid, hexanoic acid, 2-ethylhexanoic acid, dodecanoic acid, octadecanoic acid, naphthenic acid, and the like. When used in the amine/acid form, the strong tertiary aliphatic amines such as trimethylamine and triethylamine can be conveniently employed. Examples of tertiary amine/acid adducts are trimethylamine/hydrochloric acid adduct, trimethylamine/phosphoric acid adduct, trimethylamine/benzoic acid adduct, triethylamine/butyric acid adduct, triethylamine/dodecanoic acid adduct, triethylamine/benzene sulfonic acid adduct, N-methyl piperidine/lauryl sulfonic acid adduct, N-methyl piperidine/benzoic acid adduct, N-methyl piperidine/2-ethylhexanoic acid adduct, triethylenediamine/hydrochloric acid adduct, triethylenediamine/octadecanoic acid adduct, quinuclidine/hydrochloric acid adduct, 2,4,6-tri(dimethyl aminomethyl)phenol/2-ethylhexanoic acid adduct, 3-phenylpropylpyridine/benzoic acid adduct, and the like.

The tertiary amines can also be employed as tertiary amine precursors. Aminimides break down at vulcanization temperatures to release a teritary amine. Used in the compositions of this invention, the aminimides allow for greater scorch safety and yet a fast cure. Examples of these compounds are bis(trimethylamine) sebacimide, bis(dimethyl-2-hydroxypropylamine) adipimide, dimethyl-2-hydroxypropylamine laurimide, and dimethyl-2-hydroxypropylamine stearimide.

Examples of the guanidines are guanidine, tetramethyl guanidine, dibutyl guanidine, diphenyl guanidine, diorthotolyl guanidine, dicyandiamide, and the like, and reaction products of guanidines with acyl chlorides, examples being 1,1,3,3-tetramethyl-2-acetyl guanidine and 1,1,3,3-tetramethyl-2-benzyl guanidine, or with isocyanates, examples being tetramethyl guanidine/toluene diisocyanate adduct and diphenyl guanidine/phenyl isocyanate adduct.

The metal oxy compound cure accelerator combinations efficiently cure the acrylate rubbers. However, certain combinations are preferred as these combinations yield foster cure rates and more optimum vulcanizate properties. There is a preference in cure rate among the oxide, hydroxide, and carbonate forms of the non-alkali metal, this preference being hydroxide ≥ oxide > carbonate. Also, the metal oxides and hydroxides contain the highest weight percent of metal per molecule. Of the cure accelerators, the order of activity is quaternary ammonium salts > tertiary amines > guanidines.

The curative and cure accelerator can be admixed with the acrylate rubber using Banburys, extruder mixers, two-roll mills, and other known mixing machines. Standard mixing procedures and techniques are used.

The acrylate rubbers can be admixed with many other rubber compounding ingredients. Examples of such ingredients are fillers such as the carbon blacks, calcium sulfates, aluminum silicates, phenol-formaldehyde and polystyrene resins, asbestos, cotton fibers, and the like; plasticizers and extenders such as dialkyl and diaryl organic esters like diisobutyl, diisooctyl, and dibenzyl sebacates, azelates, phthalates, and the like, petroleum oils, castor oil, tall oil, and the like; antioxidants, and stabilizers such as phenyl-β-naphthylamine, 2,6-di-t-butyl paracresol, 2,2'-methylenebis-(4-ethyl-6-t-butyl phenol), 2,2'-thiobis-(4-methyl-6-t-butyl phenol), 4,4'-butylidenebis-(6-t-butyl-m-cresol), tris-(3,5-di-t-butyl-4-hydroxybenzyl)isocyanurate, tetrakis-methylene-3(3',5'-di-t-butyl-4'- hydroxyphenyl)propionate methane, distearyl thiodipropionate, tri(nonylatedphenyl)phosphite, and the like, and other ingredients such as pigments, tackifiers, flame retardants, fungicides, and the like.

The novel compositions are cured at temperatures from about 250°F. to about 450°F., whereas a more preferred range is from about 275°F. to about 400°F. Cure time varies inversely as temperature, and ranges from about 1 minute to about 60 minutes or more. The polymers can be post-cured for about 3 to 24 hours at a temperature from about 300°F. to about 375°F.

The novel compositions develop rapid and stable cures. The vulcanizates were evaluated as to their plied disk compression set (ASTM D395V), tensile and elongation (ASTM D412) and hardness (ASTM D676-durometer A). Cure times were determined following ASTM D1646, using a Mooney Viscometer with a large rotor, or using a Monsanto Rheometer or a B.F.G. Cone Curometer as described in U.S. Pat. No. 3,494,172.

The vulcanizates are useful in many applications where weatherability, high temperature serviceability, and oil resistance are required. Such applications are under-the-hood automotive parts such as gaskets, seals, packing, belting and hosing, and out-of-doors applications such as weatherstripping, sealants, and hosing.

The following examples serve to more fully illustrate the invention.

EXAMPLE I

A polymer containing ethyl acrylate, n-butyl/acrylate, methacrylate acid, and vinyl benzyl chloride was prepared using standard emulsion polymerization techniques. The recipe used is as follows:

| | |
|---|---|
| Water, grams | 2400 |
| n-butyl acrylate, grams | 1420 |
| Ethyl acrylate, grams | 380 |
| Methacrylic acid, grams | 5.7 |
| Vinyl benzyl chloride, grams | 20 |
| Gafac PE 510[1], grams | 35 |
| Daxad 17[2], grams | 9.5 |
| Sodium sulfate, grams | 5.7 |
| Diisopropylbenzene hydroperoxide, milliliters[3] | 2.8 |
| SFS[4], milliliters[5] | 3.6 |
| Sequestrene NaFe[6], milliliters[7] | 2.0 |
| $Na_2S_2O_4$, milliliters[8] | 15 |

[1] alkylphenoxy poly(ethyleneoxy)ethyl phosphate
[2] polymerized alkyl naphthalene sulfonic acid
[3] 1.4 milliliters catalyst in 10 milliliters acetone
[4] sodium formaldehyde sulfoxalate
[5] 5% by weight in water
[6] sodium ferric ethylenediamine tetraacetic acid
[7] 5% by weight in water
[8] 0.2% by weight in water The Gafac PE 510 was mixed in 200 grams of water and adjusted to a pH of 6.5. The ethyl acrylate, n-butyl acrylate, methacrylic acid, and vinyl benzyl chloride were mixed together. 2200 grams of water was charged to a vessel which had been previously evacuated and purged with nitrogen gas. One-half of the Gafac solution was added, followed by 190 grams of the monomer solution, the Daxad 17 and the sodium sulfate. The reactor mix was cooled to 17°C. and the hydroperoxide, SFS, Sequestrene NaFe, and $Na_2S_2O_4$ added to initiate the reaction. Polymerization temperature was maintained at about 20°C. to 25°C. The remaining monomer solution was proportioned into the reactor over a seven hour period. At 3.5 hours into the run, the remaining one-half of the Gafac solution was added. Total polymerization time was 10 hours. Percent conversion of monomers to polymer was above 95%. The emulsion was coagulated using a 25% by weight solution of NaCl in water, and methanol. The isolated polymer was washed with water and dried. The polymer was a rubber having about a 30 raw polymer Mooney value (Ml-4, 212°F.). The acrylate polymers of this invention are readily prepared using standard polymerization techniques. The polymers are just as easily prepared using suspension, solution, or bulk polymerization procedures and techniques. Similarly, acrylate polymers containing other halogen-containing monomers and/or other carboxyl-containing monomers were prepared following this procedure.

EXAMPLE II

The unique compositions of this invention comprise (1) an acrylate rubber having both halogen and carboxyl cure sites, and as a cure system (2) a non-alkali metal oxy compound as a curative, and either a quaternary ammonium salt, a tertiary amine, or a guanidine as a cure accelerator. Compositions deficient in any one of these essential features yield vulcanizates of inferior press cured properties. The following example demonstrates this.

Different acrylate rubbers containing only halogen cure sites, only carboxyl cure sites, and both halogen and carboxyl cure sites were employed. The compositions of these rubbers (expressed in parts by weight of monomer charged) are:

| Rubber | Ethyl Acrylate | Methacrylic Acid | Chlorine Containing Monomer |
|---|---|---|---|
| A | 99.2 | 0.8 | — |
| B | 98.3 | — | 1.7 5-chloroacetoxy-methyl-2-norbornene |
| C | 98.1 | 0.4 | 1.5 vinyl benzyl chloride |

These rubbers were mixed with a non-alkali metal oxy compound alone, a quaternary ammonium salt alone, and a combination of the metal oxy compound and the quaternary ammonium salt. The total recipes of the samples are:

| | 1 | 2 | 3 | 4 | 5 | 6 | 7 | 8 | 9 |
|---|---|---|---|---|---|---|---|---|---|
| Rubber | | | | | | | | | |
| A | 100 | 100 | 100 | — | — | — | — | — | — |
| B | — | — | — | 100 | 100 | 100 | — | — | — |
| C | — | — | — | — | — | — | 100 | 100 | 100 |
| N550 Black | 65 | 65 | 65 | 65 | 65 | 65 | 65 | 65 | 65 |
| Acrowax C | 1 | 1 | 1 | 1 | 1 | 1 | 1 | 1 | 1 |
| TE80 | 1 | 1 | 1 | 1 | 1 | 1 | 1 | 1 | 1 |
| Octylated Diphenylamine | 2 | 2 | 2 | — | — | — | — | — | — |
| BaO | 2.0 | — | 2.0 | 2.0 | — | 2.0 | 2.0 | — | 2.0 |
| Trimethyl Soya Ammonium Chloride | — | 0.7 | 0.7 | — | 0.7 | 0.7 | — | 0.7 | 0.7 |

-Continued

|  | 1 | 2 | 3 | 4 | 5 | 6 | 7 | 8 | 9 |
|---|---|---|---|---|---|---|---|---|---|
| Cone Viscurometer at 350°F. | | | | | | | | | |
| Minimum Torque | 16 | 11 | 17 | 5 | 5 | 12 | 17 | 7 | 23 |
| Torque at 12 minutes | 20 | 11 | 21 | 5 | 5 | 28 | 46 | 14 | 133 |
| Δ Torque | 4 | —[b] | 4 | —[b] | —[b] | 16 | 29 | 7 | 90 |

[a]Processing aids
[b]No evidence of cure

The samples were placed into a Cone Viscurometer at 350°F. and minimum torque and torque after 12 minutes was measured. The higher the 12 minute torque value and the greater the value of Δt (12 minute torque minus minimum torque) the better the cure. The data shows that little or no cure is obtained when only the quaternary ammonium salt is employed, no matter which rubber is used (see samples 2, 5 and 8). A very slight cure of the carboxyl cure site rubber (Rubber A) is obtained when employing the metal oxy compound only (see sample 1). There is a slight cure in sample 7 containing the rubber having both carboxyl and halogen cure sites (Rubber C) and the metal oxy compound. No cure is obtained in sample 4 containing the polymer having only halogen cure sites (Rubber B) and a metal oxy compound.

Samples 3, 6 and 9 employ a cure system consisting of both a non-alkali metal oxy compound and a quaternary ammonium salt. In all three samples, at least a slight cure was obtained. Sample 9, using Rubber C which contains both halogen and carboxyl cure sites, shows by far the greatest amount of cure. Samples 3, 6 and 9 were further evaluated as to tensile, elongation, and compression set properties of the vulcanizates. Cure conditions and properties are as follows:

|  | 3 | 6 | 9 |
|---|---|---|---|
| Cured 10 min. at 350°F. | | | |
| Tensile, psig | 550 | 580 | 1950 |
| Elongation, percent | 470 | 550 | 140 |
| Hardness, Durometer A | 60 | 65 | 71 |
| Compression set, percent (70 hrs. at 300°F., plied disks) | 109 | 91 | 53 |

The data shows that a rubber having both halogen and carboxyl cure sites (sample 9) yields a faster curing composition and a vulcanizate having significantly better properties than a rubber having either cure site alone. Hence, the example shows the superiority of the rubber used, the cure system employed, and especially the combinations of this invention.

EXAMPLE III

Acrylate polymers having both halogen and carboxyl cure sites were cured employing barium oxide as the curative and 4,4'-dipyridyl propane as the cure accelerator. The rubbers used have compositions as (expressed in parts by weight of monomer charged):

|  | D | E | F | G |
|---|---|---|---|---|
| Ethyl acrylate | 70 | 70 | 70 | 70 |
| n-butyl acrylate | 28.3 | 28.3 | 28.3 | 28.3 |
| Methacrylic acid | 0.3 | 0.4 | 0.4 | 0.4 |
| Vinyl benzyl chloride | 1.0 | 1.3 | 1.7 | — |
| 5-chloroacetoxymethyl-2-norbornene | — | — | — | 1.3 |

The recipes and cure data obtained follows:

| Rubber | 1 | 2 | 3 | 4 |
|---|---|---|---|---|
| D | 100 | — | — | — |
| E | — | 100 | — | — |
| F | — | — | 100 | — |
| G | — | — | — | 100 |
| N550 carbon black | 55 | 55 | 55 | 55 |
| N881 carbon black | 20 | 20 | 20 | 20 |
| BaO | 2.5 | 2.5 | 2.5 | 2.5 |
| 4,4-dipyridyl propane | 0.5 | 0.5 | 0.5 | 0.5 |
| Cured 30' at 338°F. | | | | |
| Tensile, psig | 1860 | 1720 | 1620 | 1380 |
| Elongation, % | 170 | 160 | 125 | 350 |
| Hardness, Duro.A | 65 | 66 | 66 | 59 |
| Compression set, % (70 hrs. at 300°F. plied disks) | 61 | 67 | 66 | 73 |
| Post-cured, 20 hrs. at 300°F. | | | | |
| Compression set, % (70 hrs. at 300°F. plied disks) | 30 | 33 | 31 | 38 |

The data shows that the vulcanizates have good cured physical properties, and excellent cured and post-cured compression set.

EXAMPLE IV

Example III was essentially repeated using rubbers E and G, and employing different cure conditions. Recipes and data obtained are as follows:

| Rubber | 1 | 2 |
|---|---|---|
| E | 100 | — |
| G | — | 100 |
| N550 Carbon black | 75 | 75 |
| BaO | 2.5 | 2.5 |
| 4,4'-dipyridyl propane | 0.5 | 0.5 |
| Cured 30" at 307°F. | | |
| Tensile, psig | 1500 | 1800 |
| Elongation, % | 360 | 170 |
| Hardness, Duro. A | 60 | 66 |
| Post-cured, 8 hrs. at 350°F. | | |
| Tensile, psig | 1800 | 1980 |
| Elongation, % | 200 | 120 |
| Hardness, Duro. A | 65 | 70 |
| Compression set, % (70 hrs. at 300°F., plied disks) | | |
| Cured 30' at 307°F. | 96 | 79 |
| Post-cured 8 hrs. at 350°F. | 42 | 34 |

EXAMPLE V

An acrylate rubber having a composition of (expressed in parts by weight of monomer charged) 30 parts ethyl acrylate, 70 parts n-butyl acrylate, 0.43 part methacrylic acid, and 1.4 parts 5-chloroacetoxymethyl-2-norbornene was cured using barium oxide at different levels as the curative and different levels of tertiary amines and a quaternary ammonium salt as cure accelerators. The data is listed in the following table. In every sample, good original and post-cured properties were obtained.

|                              | 1    | 2    | 3    | 4    | 5    | 6    | 7    | 8    | 9    |
|------------------------------|------|------|------|------|------|------|------|------|------|
| Rubber                       | 100  | 100  | 100  | 100  | 100  | 100  | 100  | 100  | 100  |
| N550 black                   | 55   | 55   | 55   | 55   | 55   | 55   | 55   | 55   | 55   |
| N881 black                   | 20   | 20   | 20   | 20   | 20   | 20   | 20   | 20   | 20   |
| Acrowax C"                   | 1.0  | 1.0  | 1.0  | 1.0  | 1.0  | 1.0  | 1.0  | 1.0  | 1.0  |
| BaO                          | 2.0  | 2.0  | 2.3  | 2.3  | 2.5  | 2.0  | 2.0  | 2.3  | 2.0  |
| Triethylene diamine          | 0.3  | 0.5  | 0.5  | 1.0  | 0.3  | —    | —    | —    | —    |
| N-methyl piperidine          | —    | —    | —    | —    | —    | 0.5  | 1.0  | 0.95 | —    |
| Dodecylpyridinium bromide[b] | —    | —    | —    | —    | —    | —    | —    | —    | 1.7  |
| Cured, 60' at 307°F.         |      |      |      |      |      |      |      |      |      |
| Tensile, psig                | 970  | 1140 | 1010 | 1000 | 1000 | 860  | 950  | 1000 | 1100 |
| Elongation, percent          | 320  | 230  | 310  | 310  | 290  | 400  | 360  | 325  | 165  |
| Hardness, Durometer A        | 56   | 58   | 56   | 60   | 51   | 55   | 55   | 59   | 62   |
| Compression set, percent (70 hrs. at 300°F.) |      |      |      |      |      |      |      |      |      |
| Cured 60" at 307°F.          | 89   | 76   | 91   | 89   | 85   | 92   | 86   | 87   | 72   |
| Post-cured 20 hrs. at 307°F. | 61   | 55   | 53   | 57   | 56   | 51   | 50   | 51   | 26   |

"processing aid
[b]50% by weight on HiSil 233 (precipitated, hydrated silica)

EXAMPLE VI

An acrylate rubber consisting of ethyl acrylate (78.0 parts), n-butyl acrylate (20.8 parts), methacrylic acid (0.31 part), and vinyl benzyl chloride (1.1 part), parts by weight based on parts by weight of each monomer charged, was cured using BaO and a N-methyl piperidine/2-ethyl hexanoic acid adduct. The recipe was 100 parts rubber, 55 parts N550 black, 20 parts N326 black, 1.0 part Acrowax C, 2.0 parts BaO, and 1.0 part of the adduct. After cure at 307°F. for 30 minutes, properties of the vulcanizate were 1500 psig tensile, 200 percent elongation, 60 Durometer A hardness, and a 63 percent compression set (70 hours at 300°F., plied disks). After a post-cure for 20 hours at 300°F., compression set was reduced to 35 percent.

EXAMPLE VII

An acrylate rubber was prepared from 70.1 weight percent of n-butyl acrylate, 20.8 weight percent of ethyl acrylate, 7.7 weight percent of methoxyethyl acrylate, 0.3 weight percent of acrylic acid, and 1.1 weight percent of vinyl benzylchloride, all based on 100 percent by weight of monomers charged. The rubber was cured using the following recipes:

| Rubber         | 100 | 100 |
|----------------|-----|-----|
| N550 Black     | 55  | 55  |
| N881 Black     | 20  | 20  |
| Acrowax C      | 2   | 2   |
| BaO            | 2.0 | 2.0 |
| Dicyandiamide  | 1.0 | —   |

| | | |
|---|---|---|
| N-methylpiperidine/ 2-ethylhexanoic acid adduct | — | 1.5 |
| Cured 30' at 307°F. | | |
| Tensile, psig | 1250 | 1310 |
| Elongation, percent | 220 | 150 |
| Hardness, Duro. A | 64 | 64 |
| Post-cure, 20 hrs. at 300°F. | | |
| Tensile, psig | 1350 | 1500 |
| Elongation, percent | 150 | 130 |
| Hardness, Duro. A | 70 | 68 |
| Compression set, percent (70 hrs. at 300°F.) | | |
| Cure | 76 | 44 |
| Post-cure | 43 | 27 |

EXAMPLE VIII

Various acrylate rubbers were cured using BaO and amines or quaternary ammonium salts. The rubbers are identified as (H) ethyl acrylate (98 parts), methacrylic acid (0.6 part), and 5-chloroacetoxymethyl-2-norbornene (1.6 part); (I) ethyl acrylate (97 parts), methacrylic acid (0.6 part), and 2-chloroethyl acrylate (2.7 part); (J) n-butyl acrylate (50 parts), methoxyethyl acrylate (50 parts), methacrylic acid (0.24 part), and vinyl benzyl chloride (1.38 part); and (K) n-butyl acrylate (75 parts), ethyl acrylate (23.5 parts), methacrylic acid (0.3 part), and vinyl benzyl chloride (1.2 parts). Cure recipes and data obtained are listed in the following table. n

|                                         | 1   | 2   | 3    | 4   | 5   | 6   | 7   |
|-----------------------------------------|-----|-----|------|-----|-----|-----|-----|
| Rubber                                  |     |     |      |     |     |     |     |
| H                                       | 100 | 100 | —    | —   | —   | —   | —   |
| I                                       | —   | —   | 100  | —   | —   | —   | —   |
| J                                       | —   | —   | —    | 100 | 100 | 100 | —   |
| K                                       | —   | —   | —    | —   | —   | —   | 100 |
| N550 Black                              | 65  | 65  | 65   | —   | —   | —   | 55  |
| N326 Black                              | —   | —   | —    | 75  | 75  | 75  | —   |
| N881 Black                              | —   | —   | —    | —   | —   | —   | 20  |
| Processing Wax                          | —   | —   | —    | —   | —   | —   | 2   |
| BaO                                     | 2.5 | 2.5 | 2.5  | 0.5 | 0.8 | 1.2 | 1.8 |
| 3-phenylpropyl pyridine                 | 0.8 | —   | —    | —   | —   | —   | —   |
| 3-phenylpropyl pyridine/ benzoic acid adduct | — | 1.2 | — | — | — | — | — |
| Dodecylpyridinium bromide               | —   | —   | 2.5" | 0.5 | 0.5 | 0.5 | —   |
| Trimethylamine/hydrochloric acid adduct | —   | —   | —    | —   | —   | —   | 0.4 |

—Continued

|  | 1 | 2 | 3 | 4 | 5 | 6 | 7 |
|---|---|---|---|---|---|---|---|
| Cured |  |  |  |  |  |  |  |
| Time, minutes | 20 | 20 | 20 | 30 | 30 | 30 | 40 |
| Temperature, °F. | 350 | 350 | 307 | 307 | 307 | 307 | 310 |
| Tensile, psig | 1390 | 1450 | 1300 | 410 | 450 | 1550 | 1250 |
| Elongation, percent | 330 | 310 | 390 | 530 | 470 | 280 | 270 |
| Hardness, Durometer A | 69 | 59 | 70 | 57 | 57 | 62 | 58 |
| Compression set, percent (70 hrs. at 300°F.) | 87 | 89 | 94 | 96 | 96 | 76 | — |
| Post-cured |  |  |  |  |  |  |  |
| Time, hours | 8 | 8 | 20 | 20 | 20 | 20 | — |
| Temperature, °F. | 350 | 350 | 300 | 300 | 300 | 300 | — |
| Tensile, psig | 2070 | 2000 | 1920 | 1130 | 1130 | 1580 | — |
| Elongation, percent | 190 | 160 | 130 | 350 | 300 | 170 | — |
| Hardness, Durometer A | 74 | 77 | 78 | 68 | 65 | 67 | — |
| Compression set, percent (70 hrs. at 300°F.) | 43 | 43 | 33 | 60 | 52 | 33 | — |

"50% by weight on HiSil 233 (precipitated silica)

All of the samples cured up well. Samples 4, 5 and 6 demonstrate that low levels of the non-alkali metal oxy compound can be employed and yet obtain a good post-cured vulcanizate. When over 1 part by weight of the metal oxy compound is used, excellent original properties are obtained. This example, along with Examples II to VII demonstrate many variations in the composition of the acrylate rubber, particularly in the level and type of acrylate monomer, carboxyl-containing monomer, and chlorine-containing monomer; variations in the level of non-alkali metal oxy compound, and finally, variations in the level and type of amine or quaternary ammonium salt cure accelerator.

EXAMPLE IX

Various acrylate rubbers having both halogen and carboxyl cure sites were cured using lead oxide as the non-alkali metal oxy compound. The rubbers are as follows: (L) 70 parts n-butyl acrylate, 30 parts ethyl acrylate, 0.43 part methacrylic acid, and 1.4 part 5-chloroacetoxymethyl-2-norbornene; (M) 96.7 parts ethyl acrylate, 0.6 part methacrylic acid, and 2.7 parts 2-chloroethyl acrylate; and (N) 97.8 parts ethyl acrylate, 0.6 part methacrylic acid, and 1.6 part 5-chloroacetoxymethyl-2-norbornene.

The data shows that good original and post-cured properties are obtained when employing a lead oxy compound, i.e., PbO, as the curative.

EXAMPLE X

Following the procedure in Example IX, an acrylate rubber consisting of ethyl acrylate (70 parts), n-butyl acrylate (28.3 parts), methacrylic acid (0.06 part), and 5-chloroacetoxymethyl-2-norbornene (1.6 part) was cured using red lead oxide. The recipe was 100 parts rubber, 65 parts N550 black, 5.0 parts $Pb_3O_4$, and 1.0 part dodecylpyridinium bromide. Cured 30 minutes at 350°F., tensile was 1600 psig, elongation 330 percent, 70 durometer A hardness, and an 88 percent compression set (70 hours at 300°F.). After post-cure for 8 hours at 350°F., tensile was 2180 psig, elongation was 110 percent, hardness was 73, and compression set was 55 (70 hours at 350°F.).

EXAMPLE XI

An acrylate rubber containing both halogen and carboxyl cure sites (i.e., rubber K of Example VIII) was cured using barium oxide as the curative and a tertiary amine precursor as the cure accelerator. The precursor used is an aminimide marketed by the Ashland Chemical Company. The aminimides break down at vulcani-

|  | 1 | 2 | 3 | 4 | 5 | 6 |
|---|---|---|---|---|---|---|
| Rubber |  |  |  |  |  |  |
| L | 100 | 100 | 100 | — | — | — |
| M | — | — | — | 100 | — | — |
| N | — | — | — | — | 100 | 100 |
| N550 Black | 55 | 55 | 55 | 65 | 65 | 65 |
| N881 Black | 20 | 20 | 20 | — | — | — |
| Acrowax C | 1.0 | 1.0 | 1.0 | — | — | — |
| PbO | 2.8 | 2.4 | 2.4 | 2.5 | 2.8 | 2.8 |
| Dodecylpyridinium bromide" | 1.5 | 1.5 | 2.5 | 2.5 | — | — |
| 3-phenylpropyl pyridine | — | — | — | — | 0.8 | — |
| 3-phenylpropyl pyridine/ benzoic acid adduct | — | — | — | — | — | 1.2 |
| Cured |  |  |  |  |  |  |
| Time, minutes | 30 | 30 | 30 | 20 | 20 | 20 |
| Temperature, °F. | 307 | 307 | 307 | 350 | 350 | 350 |
| Tensile, psig | 1050 | 1000 | 1200 | 1780 | 860 | — |
| Elongation, percent | 300 | 330 | 210 | 370 | 530 | — |
| Hardness, Durometer A | 54 | 54 | 55 | 60 | 71 | — |
| Compression set, percent (70 hrs. at 300°F.) | 84 | 90 | 70 | 62 | 100 | — |
| Post-Cured |  |  |  |  |  |  |
| Time, hours | 20 | 20 | 20 | 8 | 8 | 8 |
| Temperature, °F. | 307 | 307 | 307 | 350 | 350 | 350 |
| Tensile, psig | 1170 | 1320 | 1330 | 1850 | 1950 | 1250 |
| Elongation, percent | 100 | 110 | 90 | 160 | 140 | 130 |
| Hardness, Durometer A | 70 | 68 | 70 | 70 | 80 | 74 |
| Compression set, percent (70 hrs. at 300°F.) | 39 | 38 | 36 | 21 | 58 | 65 |

"50% by weight on precipitated silica zation temperatures to yield tertiary amines. Their use in the compositions of this invention allows for greater scorch safety and yet a fast cure. The recipe used is: 100 parts rubber, 55 parts N550 black, 20 parts N881 black, 2 parts processing wax, 1-8 parts barium oxide, and 0.8 part of the aminimide, bis(trimethylamine) sebacimide. Cured at 310°F. for 40 minutes, the properties are 1450 psig tensile, 200 percent elongation, and 61 durometer A hardness. Scorch time at two torque units increase ($\Delta t_2$) is 8 minutes, or roughly twice that typically obtained when employing a free tertiary amine.

EXAMPLE XII

To evaluate a broad range of non-alkali metal oxy compounds, and tertiary amines, guanidines, and quaternary ammonium salt that may be employed, and to develop support for the scope of this invention, a screening procedure was developed. The procedure uses a liquid acrylate polymer which has all of the features of the solid acrylate rubber of the invention, i.e., similar acrylate monomer and copolymerizable monomer (if used) content, and the same halogen-containing and carboxyl-containing monomers. The low molecular weight liquid polymer can be prepared using standard emulsion polymerization recipes and techniques except for the use of high levels of t-dodecyl mercaptan as a chain modifier.

The screening procedure comprises mixing the liquid acrylate polymer with a non-alkali metal oxy compound and a cure accelerator selected from tertiary amines, guanidines, or quaternary ammonium salts, placing the mixture into a large test tube, placing the filled test tube into a 150°C. oil bath, putting a stainless steel spatula into the mixture in the tube, said spatula being turned in place, and measuring in minutes the time until the mixture gels. A shorter gel time indicates faster cure.

The liquid acrylate polymer used for the screening procedure has a composition consisting of ethyl acrylate (48.8 parts), n-butyl acrylate (48.8 parts), methacrylic acid (0.49 part), and vinyl benzyl chloride (1.95 part), said parts being parts by weight of monomer charged to the reactor. Polymer viscosity (in bulk) is 720,000 centipoise measured at 25°C. using a Brookfield LVT Viscometer at 0.6 rpm with spindle No. 4. The rsults obtained are in the following table. The curative and cure accelerator are given in parts by weight per 100 parts of polymer.

| Parts | Curative | Parts | Cure Accelerator | Gel Time (minutes) |
|---|---|---|---|---|
| 3.0 | Barium oxide | 1.0 | Quinuclidine/hydrochloric acid adduct | 170 |
| 6.0 | Barium oxide | 1.0 | Quinuclidine/hydrochloric acid adduct | 10 |
| 5.0 | Barium oxide | 0.5 | Dodecyl pyridinium bromide | 17 |
| 5.0 | Barium oxide | 3.0 | N-methyl piperidine/lauryl sulfonic acid adduct | 180 |
| 3.0 | Barium oxide | 3.0 | N-methyl piperidine/lauryl sulfonic acid adduct | 50 |
| 5.0 | Barium oxide | 1.0 | Dicyandiamide | 30 |
| 5.0 | Barium oxide | 1.0 | 2,4,6-tri(dimethylaminomethyl)phenol | 33 |
| 5.0 | Barium oxide | 0.5 | 2,4,6-tri(dimethylaminomethyl)phenol | 65 |
| 5.0 | Barium oxide | 1.0 | 2,4,6-tri(dimethylaminomethyl)phenol/2-ethylhexanoic acid adduct | 19 |
| 5.0 | Barium oxide | 1.0 | Tri-n-butyl amine | 165 |
| 5.0 | Barium oxide | 1.0 | N-methyl morpholine | 16 |
| 5.0 | Barium oxide | 1.0 | N-methyl piperidine | 9 |
| 5.0 | Barium oxide | 1.0 | 4,4'-dipyridylpropane | 14 |
| 5.0 | Barium oxide | 0.5 | Trimethyl soya ammonium chloride | 38 |
| 5.0 | Barium oxide | 0.5 | (Tetradecyl)trimethyl ammonium chloride | 7 |
| 5.0 | Barium oxide | 2.0 | N-methylpiperidine/2-ethylhexanoic acid adduct | 8 |
| 5.0 | Barium oxide | 1.0 | Tetramethyl guanidine/toluene diisocyanate adduct | 10 |
| 5.0 | Barium oxide | 1.0 | Tetramethyl guanidine/2-benzoyl chloride adduct | 36 |
| 5.0 | Barium Hydroxide | 0.5 | Trimethyl soya ammonium chloride | 6 |
| 5.0 | Barium Hydroxide | 1.0 | Trimethyl soya ammonium neodecanoate | 6 |
| 5.0 | Barium Hydroxide | 1.0 | Benzyl trimethyl ammonium alkyl benzene sulfonate | 11 |
| 4.0 | Barium Carbonate | 1.0 | Tetramethyl guanidine/toluene diisocyanate adduct | 10 |
| 5.0 | Lead Monoxide | 0.5 | Trimethyl soya ammonium chloride | 73 |
| 5.0 | Lead Monoxide | 0.5 | Trimethyl soya ammonium trimethyl hexanoate | 330 |
| 5.0 | Lead Monoxide | 1.0 | Trimethyl soya ammonium neodecanoate | 12 |
| 5.0 | Lead Monoxide | 1.0 | Benzyl trimethyl ammonium alkyl benzyl sulfonate | 120 |
| 5.0 | Lead Monoxide | 0.6 | Benzyl trimethyl ammonium boroate | 42 |
| 5.0 | Lead Monoxide | 1.0 | Benzyl trimethyl ammonium hydrogenphosphate | 13 |
| 5.0 | Calcium Oxide | 0.5 | Trimethyl soya ammonium chloride | 14 |
| 5.0 | Calcium Oxide | 1.0 | Trimethyl soya ammonium neodecanoate | 11 |
| 5.0 | Calcium Oxide | 1.0 | Benzyl trimethyl ammonium hydrogenphosphate | 24 |
| 5.0 | Calcium Oxide | 1.0 | Benzyl trimethyl ammonium alkyl benzyl sulfonate | 78 |
| 5.0 | Calcium Hydroxide | 1.0 | Trimethyl soya ammonium neodecanoate | 12 |
| 3.0 | Magnesium Oxide | 1.0 | Trimethyl soya ammonium neodecanoate | 24 |
| 5.0 | Cupric Oxide | 1.0 | Trimethyl soya ammonium neodecanoate | 32 |
| 10.0 | Zinc Oxide | 1.0 | Trimethyl soya ammonium neodecanoate | 110 |
| 5.0 | Ferric Oxide | 1.0 | Trimethyl soya ammonium neodecanoate | 180 |
| 10.0 | Dibutyl tin Oxide | 1.0 | Trimethyl soya ammonium neodecanoate | 8 |
| 4.0 | Dibutyl tin Oxide | 1.0 | Dodecyl pyridinium bromide | 60 |

I claim:

1. A composition comprising (1) an acrylate rubber consisting essentially of (a) from about 40 percent to about 99.8 percent by weight of an acrylate of the formula

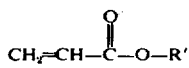

wherein R' is selected from the group consisting of an alkyl radical containing 1 to 18 carbon atoms, an alkoxyalkyl, an alkylthioalkyl, and a cyanoalkyl radical containing 2 to about 12 carbon atoms, (b) from about 0.1 percent to about 30 percent by weight of a halogen-containing monomer selected from the group consisting of halogen-containing vinylidene hydrocarbons and halogen-containing monomers having the halogen group at least two carbon atoms removed from an oxygen atom, (c) from about 0.1 percent to about 20 percent by weight of a carboxyl-containing monomer containing from 3 to about 8 carbon atoms, and (d) up to about 35 percent by weight of a copolymerizable monomer containing a terminal vinylidene group selected from the group consisting of phenyl acrylate, cyclohexyl acrylate, methyl methacrylate, ethyl methalcrylate, vinyl acetate, vinyl propionate, allyl acetate, methyl vinyl ketone, vinyl methyl ether, vinyl ethyl ether, allyl methyl ether, styrene, α-methyl styrene, vinyl toluene, acrylonitrile, methacrylonitrile, acrylamide, methacrylamide, N-methyl methacrylamide, butadiene, isoprene, divinyl benzene, divinyl ether, and diethylene glycol diacrylate, and (2) a curative system consisting essentially of (a) from about 0.5 part to about 20 parts by weight of a nonalkali metal oxy compound selected from the group consisting of oxides, hydroxides, and carbonates of barium, lead, calcium, magnesium, strontium, copper, tin, iron, zinc, and cadmium, and (b) from about 0.1 part to about 5 parts by weight of a cure accelerator selected from the group consisting of quaternary ammonium salts, tertiary amines, and guanidines, said parts by weight of nonalkali metal oxy compound and cure accelerator based on 100 parts by weight of acrylate rubber.

2. A composition of claim 1 wherein (1) is an acrylate rubber of (a) from about 65 percent to about 99.6 percent by weight of an acrylate wherein R' is selected from the group consisting of alkyl radicals containing 1 to about 10 carbon atoms and alkoxyalkyl radicals containing 2 to about 8 carbon atoms, (b) from about 0.2 percent to about 15 percent by weight of a halogen-containing monomer, (c) from about 0.2 percent to about 10 percent by weight of a carboxyl-containing monomer, and (d) up to about 10 percent by weight of a copolymerizable monomer containing a terminal vinylidene group.

3. A composition of claim 2 wherein (2) the nonalkali metal oxy compound is selected from the group consisting of barium oxide, barium hydroxide, barium carbonate, lead monoxide, red lead oxide, calcium oxide, calcium hydroxide, magnesium oxide, magnesium hydroxide, cupric oxide, zinc oxide, zinc hydroxide, ferric oxide, and dibutyl tin oxide.

4. A composition of claim 3 wherein (a) is selected from the group consisting of ethyl acrylate, n-butyl acrylate, 2-ethylhexyl acrylate, methoxy ethyl acrylate, and ethoxy ethyl acrylate, (b) is selected from the group consisting of vinyl chloroacetate, allyl chloroacetate, 2-chloroethyl acrylate and methacrylate, 2-chloroethyl vinyl ether, 3-chloropropyl acrylate, chloromethyl vinyl ketone, 4-chloro-2-butenyl acrylate and methacrylate, 2-chloroacetoxy ethyl acrylate and methacrylate, vinyl benzyl chloride, 5-chloromethyl-2-norbornene, and 5-chloroacetoxymethyl-2-norbornene, (c) is selected from the group consisting of acrylic acid, methacrylic acid, and itaconic acid, and (d) is selected from the group consisting of vinyl acetate, methyl methacrylate, ethyl methacrylate, styrene, acrylonitrile, acrylamide, and diethylene glycol diacrylate.

5. A composition of claim 2 wherein (4) the quaternary ammonium salts have the structure

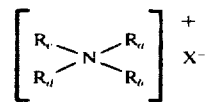

wherein $R_a$, $R_b$, $R_c$ and $R_d$ are hydrocarbon radicals selected from the group consisting of alkyl, aryl, alkaryl and aralkyl radicals containing 1 to 18 carbon atoms, or wherein two or three of the $R_a$, $R_b$, $R_c$ and $R_d$ radicals form with the nitrogen atom a heterocyclic structure containing 3 to 8 atoms selected from the group consisting of C, N, O and S atoms, at least two of which are C; and X is an anion from an organic or inorganic acid, wherein the acidic hydrogen is attached to a halogen or an oxygen atom.

6. A composition of claim 5 wherein X is selected from the group consisting of $Cl^-$, $Br^-$, $I^-$, $HSO_4^-$, $H_2PO_4^-$, $RCOO^-$, $ROSO_3^-$, $RSO_3^-$, $H_2BO_3^-$, and $ROPO_3H^-$, where R is an aliphatic alkyl or alkaryl radical containing 1 to 18 carbon atoms.

7. A composition of claim 6 wherein the quaternary ammonium salt is selected from the group consisting of trimethyl soya ammonium chloride, dodecylpyridinium bromide, (tetradecyl) trimethyl ammonium chloride, trimethyl soya ammonium neodecanoate, benzyl trimethyl ammonium alkylbenzene sulfonate, trimethyl soya ammonium trimethyl hexanoate, benzyl trimethyl ammonium boroate, and benzyl trimethyl ammonium hydrogen phosphate.

8. A composition of claim 2 where in (4) the tertiary amines are selected from the group consisting of aliphatic amines, heterocyclic amines, and cyclic methyleneamines.

9. A composition of claim 8 where the tertiary amines are employed as tertiary amine/acid adducts or aminimides.

10. A composition of claim 8 wherein the tertiary amines are selected from the group consisting of 4,4'-dipyridyl propane, triethylenediamine, N-methyl piperidine, 3-phenylpropyl pyridine, quinuclidine, 2,4,6-tri(-dimethylaminomethyl)phenol, tri-n-butyl amine, N-methyl morpholine, and trimethyl amine.

11. A composition of claim 2 wherein (4) the guanidines are employed as guanidine/acyl chloride adducts or as guanidine/isocyanate adducts.

12. A composition of claim 2 where in (4) the guanidines are selected from the group consisting of dicyandiamide and tetramethyl guanidine.

13. A composition of claim 7 wherein (1)(a) is ethyl acrylate, (1)(b) is 5-chloroacetoxymethyl-2- norbornene, (1)(c) is methacrylic acid, (2)(a) is barium oxide, and (2)(b) is dodecyl pyridinium bromide.

14. A composition of claim 7 wherein the acrylate rubber consists of interpolymerized units of ethyl acrylate, methacrylic acid, and vinyl benzyl chloride, and the curative system consists essentially of barium oxide and trimethylsoya ammonium chloride.

15. A composition of claim 7 wherein the acrylate rubber consists of interpolymerized units of ethyl acrylate, n-butyl acrylate, methacrylic acid, and 5-chloroacetoxymethyl-2-norbornene, and the curative system consists essentially of red lead oxide and dodecyl pyridinium bromide.

16. A composition of claim 10 wherein the acrylate rubber consists of interpolymerized units of ethyl acrylate, methacrylic acid, and 5-chloroacetoxymethyl-2-norbornene, and the curative system consists essentially of lead oxide and 3-phenylpropyl pyridine.

17. A composition of claim 10 wherein the acrylate rubber consists essentially of interpolymerized units of ethyl acrylate, n-butyl acrylate, methacrylic acid, and vinyl benzyl chloride, and the curative system consists essentially of barium oxide and 4,4'-dipyridylpropane.

18. A composition of claim 9 wherein the acrylate rubber consists essentially of interpolymerized units of ethyl acrylate, n-butyl acrylate, methacrylic acid, and vinyl benzyl chloride, and the curative system consists essentially of barium oxide and bis(trimethylamine) sebacimide.

19. A composition of claim 12 wherein the acrylate rubber consists of interpolymerized units of ethyl acrylate, n-butyl acrylate, methoxyethyl acrylate, acrylic acid, and vinyl benzyl chloride, and the curative system consists essentially of barium oxide and dicyandiamide.

* * * * *

UNITED STATES PATENT OFFICE
CERTIFICATE OF CORRECTION

PATENT NO. : 3,910,866
DATED : October 7, 1975
INVENTOR(S) : Roger E. Morris

It is certified that error appears in the above-identified patent and that said Letters Patent are hereby corrected as shown below:

Page 1, the Title Page, after the phrase [76] Inventor: Roger E. Morris, 2951 8th St., Cuyahoga Falls, Ohio 44221, add the following --[73] Assignee: The B.F.Goodrich Company, New York, N. Y. ---.

Signed and Sealed this

Twenty-first Day of March 1978

[SEAL]

Attest:

RUTH C. MASON
Attesting Officer

LUTRELLE F. PARKER
Acting Commissioner of Patents and Trademarks